United States Patent
Nishimura et al.

(10) Patent No.: US 8,851,556 B2
(45) Date of Patent: Oct. 7, 2014

(54) VEHICLE-BODY SIDE PORTION STRUCTURE OF VEHICLE

(71) Applicant: Mazda Motor Corporation, Hiroshima (JP)

(72) Inventors: Yoshikazu Nishimura, Hiroshima (JP); Kei Ikeda, Hiroshima (JP); Kazuya Fukutani, Hiroshima (JP); Naoki Kaneko, Hiroshima (JP); Noboru Yoshii, Higashihiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 13/938,359

(22) Filed: Jul. 10, 2013

(65) Prior Publication Data

US 2014/0028056 A1    Jan. 30, 2014

(30) Foreign Application Priority Data

Jul. 27, 2012   (JP) ................................ 2012-166947

(51) Int. Cl.
*B62D 25/04*    (2006.01)

(52) U.S. Cl.
CPC ...................................... *B62D 25/04* (2013.01)
USPC ............. 296/193.06; 296/187.12; 296/203.03

(58) Field of Classification Search
USPC .......... 296/193, 193.05, 210, 187.05, 193.06, 296/203.02, 187.12, 187.03, 203.03; 29/897.2
See application file for complete search history.

(56) References Cited

U.S. PATENT DOCUMENTS

| | | | |
|---|---|---|---|
| 6,474,726 B1 * | 11/2002 | Hanakawa et al. | 296/191 |
| 7,445,269 B2 * | 11/2008 | Yustick et al. | 296/187.01 |
| 2011/0101734 A1 * | 5/2011 | Gunther et al. | 296/193.06 |
| 2011/0156446 A1 * | 6/2011 | Iwase et al. | 296/193.06 |
| 2011/0241383 A1 * | 10/2011 | Shin et al. | 296/193.06 |
| 2012/0119477 A1 * | 5/2012 | Kim | 280/801.2 |
| 2012/0256445 A1 * | 10/2012 | Baccouche et al. | 296/193.06 |

FOREIGN PATENT DOCUMENTS

JP        2009-262614 A      11/2009

\* cited by examiner

*Primary Examiner* — Pinel Romain
(74) *Attorney, Agent, or Firm* — Studebaker & Brackett PC (57) ABSTRACT

A center pillar includes a first reinforcement panel which is arranged between an outer panel and an inner panel, comprises a bottom wall portion, both-side vertical wall portions extending in a vehicle width direction from the bottom wall portion, and both-side flange portions, and has a cross section formed in substantially a hat shape. A second reinforcement panel comprising a bottom wall portion and both-side vertical wall portions and having a cross section formed in substantially a U shape is arranged inside the first reinforcement panel. The second reinforcement panel is joined to the first reinforcement panel such that only the bottom wall portion and one of the both-side vertical wall portions are joined to the bottom wall portion and one of the both-side vertical wall portions, respectively.

10 Claims, 9 Drawing Sheets

VEHICLE-BODY SIDE PORTION STRUCTURE OF VEHICLE

BACKGROUND OF THE INVENTION

The present invention relates to a vehicle-body side portion structure of a vehicle, and in particular to a vehicle-body side portion structure of a vehicle, which includes a center pillar comprising an outer panel, an inner panel, and a first reinforcement panel provided between the outer panel and the inner panel.

At a vehicle-body side portion of a vehicle, such as an automotive vehicle, is provided a center pillar extending in a vehicle-body vertical direction at a position between front and rear door openings. The center pillar is generally formed by an outer panel forming a vehicle-body outside and an inner panel forming a vehicle-body inside so as to have a closed cross section.

A center pillar additionally equipped with a reinforcement panel which is provided inside its closed cross section formed by its outer panel and its inner panel for increasing strength and rigidity thereof is used widely as well. As this kind of reinforcement panel, a first reinforcement panel which is provided between the outer panel and the inner panel and a second reinforcement panel which is joined to the first reinforcement panel are also known.

Japanese Patent Laid-Open Publication No. 2009-262614, for example, discloses a center pillar, in which both-side vertical wall portions of a second reinforcement panel having a cross section formed in substantially a U shape are joined, by welding, to both-side vertical wall portions of a first reinforcement panel having a cross section formed in substantially a hat shape, and a bottom wall portion formed between the both-side vertical wall portions of the second reinforcement panel is joined, by welding, to a bottom wall portion of a protrusion portion of the first reinforcement panel.

In the center pillar disclosed in the above-described patent document, the second reinforcement panel is joined to the first reinforcement panel at the bottom wall portion and the both-side vertical wall portions of the second reinforcement panel. Therefore, an accuracy of dimensions may be required to the both-side vertical wall portions of the second reinforcement panel.

Figure 8:
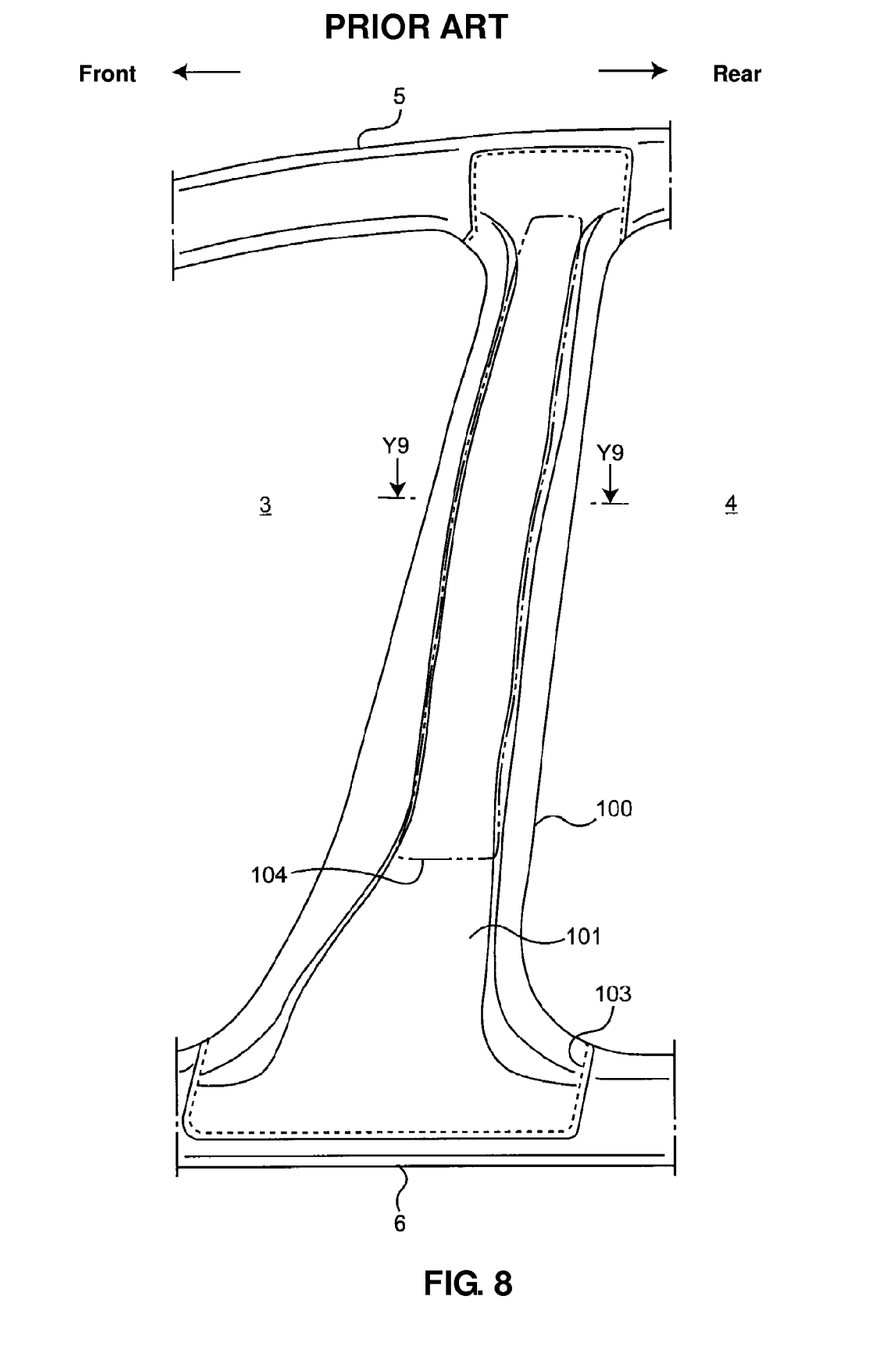
FIG. 8 is a view showing a center pillar of a conventional vehicle body.
Figure 9:
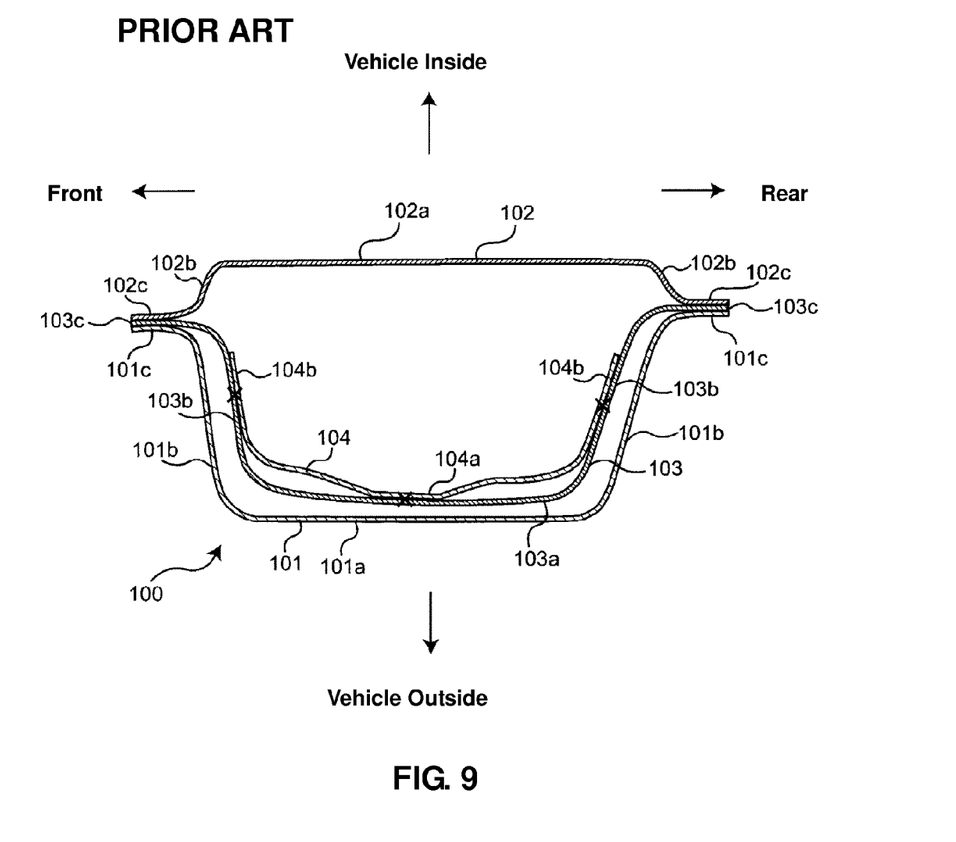
FIG. 9 is a sectional view of the center pillar taken along line Y9-Y9 of FIG. 8.

FIG. 8 is a view showing a center pillar of a conventional vehicle body, and FIG. 9 is a sectional view of the center pillar taken along line Y9-Y9 of FIG. 8. A center pillar 100 shown in FIGS. 8 and 9 extends in a vehicle-body vertical direction at a position between front and rear door openings 3, 4, and its upper end is joined to a roof rail 5 and its lower end is joined to a side sill 6.

The center pillar 100 comprises, as show in FIG. 9, an outer panel 101 comprising a bottom wall portion 101a, both-side vertical wall portions 101b, and both-side flange portions 101c and having a cross section formed in substantially a hat shape, an inner panel 102 comprising a bottom wall portion 102a, both-side vertical wall portions 102b, and both-side flange portions 102c and having a cross section formed in substantially a hat shape, and a first reinforcement panel 103 comprising a bottom wall portion 103a, both-side vertical wall portions 103b, and both-side flange portions 103c and having a cross section formed in substantially a hat shape. Herein, these flange portions 101c, 102c, 103c are joined together in a state in which the first reinforcement panel 103 is provided between the outer panel 101 and the inner panel 102. Thereby, the center pillar 100 is formed so as to have a closed cross section.

Additionally, a second reinforcement panel 104, which comprises a bottom wall portion 104a and both-side vertical wall portions 104b and has a cross section formed in substantially a U shape, is provided inside the first reinforcement panel 103. The second reinforcement panel 104 is provided inside the first reinforcement panel 103 such that the bottom wall portion 104a and the both-side vertical wall portions 104b of the second reinforcement panel 104 substantially match the bottom wall portion 103a and the both-side vertical wall portions 103b of the first reinforcement panel 103, respectively, and the second reinforcement panel 104 is joined to the first reinforcement panel 103 such that the bottom wall portion 104a and the both-side vertical wall portions 104a of the second reinforcement panel 104 are respectively joined, by spot welding, to the bottom wall portion 103a and the both-side vertical wall portions 103b of the first reinforcement panel 103 at positions indicated by x marks in FIG. 9.

In this case in which the second reinforcement panel 104 is joined to the first reinforcement panel 103 at its bottom wall portion 104a and its both-side vertical wall portions 104b, it is required that a specified gap is provided between the both-side vertical wall portions 104b of the second reinforcement panel 104 and the both-side vertical wall portions 103b of the first reinforcement panel 103 at the spot welding in order to obtain an appropriate joint quality. Thus, an accuracy of dimensions is required to the both-side vertical wall portions 104b of the second reinforcement panel 104.

In a case in which the distance between the both-side vertical wall portions 104b of the second reinforcement panel 104 is shorter than a specified distance, the gap between the both-side vertical wall portions 104b of the second reinforcement panel 104 and the both-side vertical wall portions 103b of the first reinforcement panel 103 becomes large, so that the appropriate joint quality cannot be obtained. Consequently, there is a concern that a reinforcing effect by the second reinforcement panel 104 may not be effectively obtained.

In the case in which the distance between the both-side vertical wall portions 104b of the second reinforcement panel 104 is shorter than the specified distance, by setting the gap between one of the vertical wall portions 104b of the second reinforcement panel 104 and one of the vertical wall portions 103b of the first reinforcement panel 103 at the specified gap, the appropriate joint quality can be obtained for the above-described one of the vertical wall portions 104b of the second reinforcement panel 104. In this case, however, the gap between the other of the vertical wall portions 104b of the second reinforcement panel 104 and the other of the vertical wall portions 103b of the first reinforcement panel 103 becomes large, so that the appropriate joint quality cannot be obtained. Accordingly, it becomes necessary that the second reinforcement panel 104 is modified or disused. This may cause deterioration of productivity at the time of vehicle-body manufacturing.

Meanwhile, in a case in which the distance between the both-side vertical wall portions 104b of the second reinforcement panel 104 is longer than the specified distance, there is a concern that the second reinforcement panel 104 inserted into the first reinforcement panel 103 may not be joined to the first reinforcement panel 103. In this case, likewise, it may be necessary that the second reinforcement panel 104 is modified or disused, and this may cause deterioration of productivity at the time of vehicle-body manufacturing.

In particular, in a case in which the second reinforcement panel 104 is made of a high-tension steel plate which is formed by pressing, since it is difficult to ensure the accuracy of dimensions due to a large spring back occurring after the press forming, the necessity of modifying or disusing the second reinforcement panel 104 increases more in order to obtain the stable joint quality. This may further cause the problem of productivity at the time of vehicle-body manufacturing.

SUMMARY OF THE INVENTION

Accordingly, an object of the present invention is to provide a vehicle-body side portion structure of a vehicle which can obtain the stable joint quality at the reinforcement panels of the center pillar and also improve the productivity at the time of vehicle-body manufacturing.

According to the present invention, there is provided a vehicle-body side portion structure of a vehicle, which includes a center pillar extending in a vehicle-body vertical direction at a position between front and rear door openings formed at a vehicle-body side portion, the center pillar comprising an outer panel forming a vehicle-body outside, an inner panel forming a vehicle-body inside, a first reinforcement panel provided between the outer panel and the inner panel and comprising a bottom wall portion extending in a vehicle-body longitudinal direction, both-side vertical wall portions extending in a vehicle-body width direction from the bottom wall portion, and both-side flange portions extending in the vehicle-body longitudinal direction from the both-side vertical wall portions, whereby a cross section of the first reinforcement panel is formed in substantially a hat shape, and a second reinforcement panel provided inside the first reinforcement panel and comprising a bottom wall portion extending in the vehicle-body longitudinal direction and both-side vertical wall portions extending in the vehicle-body width direction from the bottom wall portion, whereby a cross section of the second reinforcement panel is formed in substantially a U shape, wherein the second reinforcement panel is provided inside the first reinforcement panel such that the bottom wall portion and the both-side vertical wall portions of the second reinforcement panel substantially match the bottom wall portion and the both-side vertical wall portions of the first reinforcement panel, respectively, and the second reinforcement panel is joined to the first reinforcement panel such that the bottom wall portion of the second reinforcement panel is joined to the bottom wall portion of the first reinforcement panel and one of the both-side vertical wall portions of the second reinforcement panel is joined to one of the both-side vertical wall portions of the first reinforcement panel which matches the one of the both-side vertical wall portions of the second reinforcement panel, without joining the other of the both-side vertical wall portions of the second reinforcement panel to the other of the both-side vertical wall portions of the first reinforcement panel which matches the other of the both-side vertical wall portions of the second reinforcement panel.

According to the present invention, since the second reinforcement panel is joined to the first reinforcement panel only at its bottom wall portion and its one of the vertical wall portions, comparing to a case in which the second reinforcement panel is joined to the first reinforcement panel at its bottom wall portion and both of its vertical wall portions, the gap between respective joint portions of the vertical wall portion of the second reinforcement panel and the vertical wall portion of the first reinforcement panel can be restrained from being improperly changeable, thereby obtaining the stable joint quality at the reinforcement panels of the center pillar.

In the case in which the second reinforcement panel is joined to the first reinforcement panel at its bottom wall portion and both of its vertical wall portions, since the high accuracy of dimensions is required to the both-side vertical wall portions of the second reinforcement panel, the necessity of modifying or disusing the second reinforcement panel after its press forming may increase in order to ensure the accuracy of dimensions, so that the productivity may deteriorate. However, since the second reinforcement panel is joined to the first reinforcement panel only at its bottom wall portion and its one of the vertical wall portions according to the present invention, the stable joint quality can be obtained at the reinforcement panels of the center pillar and also the productivity at the time of vehicle-body manufacturing can be improved. In particular, the above-described effects can be effectively obtained in the case in which the second reinforcement panel is made of the high-tension steel plate, which may cause a large spring back occurring after the press forming According to an embodiment of the present invention, the second reinforcement panel is configured such that a ridgeline between the bottom wall portion thereof and the other of the both-side vertical wall portions thereof is continuous along a longitudinal direction of the center pillar. In this case, comparing with a case in which the second reinforcement panel is configured such that the ridgeline between the bottom wall portion thereof and the other of the both-side vertical wall portions thereof is uneven, thereby not continuous along the longitudinal direction of the center pillar, any stress-concentration source or deformation starting-point can be properly restrained from being formed at the time of load inputting, so that the reinforcing effect by the second reinforcement panel can be increased. Even in the case in which the second reinforcement panel is joined to the first reinforcement panel only at its bottom wall portion and its one of the vertical wall portions, the reinforcing effect by the second reinforcement panel can be obtained effectively.

According to another embodiment of the present invention, the second reinforcement panel is arranged such that the bottom wall portion thereof is positioned on an outward side, in the vehicle-body width direction, relative to the both-side vertical wall portions thereof, and the other of the both-side vertical wall portions of the second reinforcement panel extends inward, in the vehicle-body width direction, more than the one of the both-side vertical wall portions of the second reinforcement panel. In this case, comparing to a case in which the other of the both-side vertical wall portions of the second reinforcement panel extends, in the vehicle-body width direction, to substantially the same position as the one of the both-side vertical wall portions of the second reinforcement panel does, the modulus of section of the center pillar can be increased, thereby increasing the rigidity of the center pillar.

According to another embodiment of the present invention, the other of the both-side vertical wall portions of the second reinforcement panel is arranged substantially in parallel to the other of the both-side vertical wall portions of the first reinforcement panel with a specified gap therebetween. Thereby, it can be prevented that the other of vertical wall portions of the second reinforcement panel interferes with the other of vertical wall portions of the first reinforcement panel, and thereby noises are generated. In a case in which the accuracy of dimensions of the both-side vertical wall portions is inferior, the above-described effects can be obtained effectively.

According to another embodiment of the present invention, the one of the both-side vertical wall portions of the second reinforcement panel is joined to the one of the both-side vertical wall portions of the first reinforcement panel at three points of an upper position, a central position, and a lower position in the vehicle-body vertical direction of the center pillar. Thereby, the productivity at the time of manufacturing vehicle body can be improved, thereby obtaining the reinforcing effect by the second reinforcement panel effectively.

Other features, aspects, and advantages of the present invention will become apparent from the following description which refers to the accompanying drawings.

DETAILED DESCRIPTION OF THE INVENTION

Figure 1:
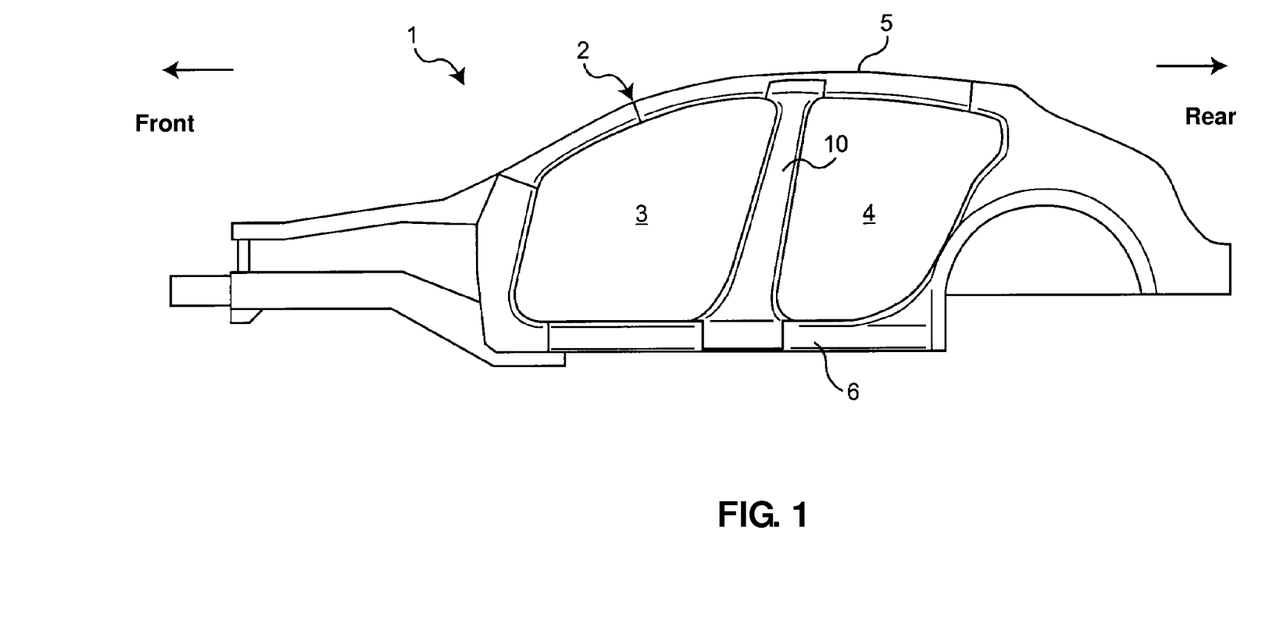
FIG. 1 is a side view of a vehicle body to which a vehicle-body side portion structure of a vehicle according to an embodiment of the present invention is applied.
Figure 2:
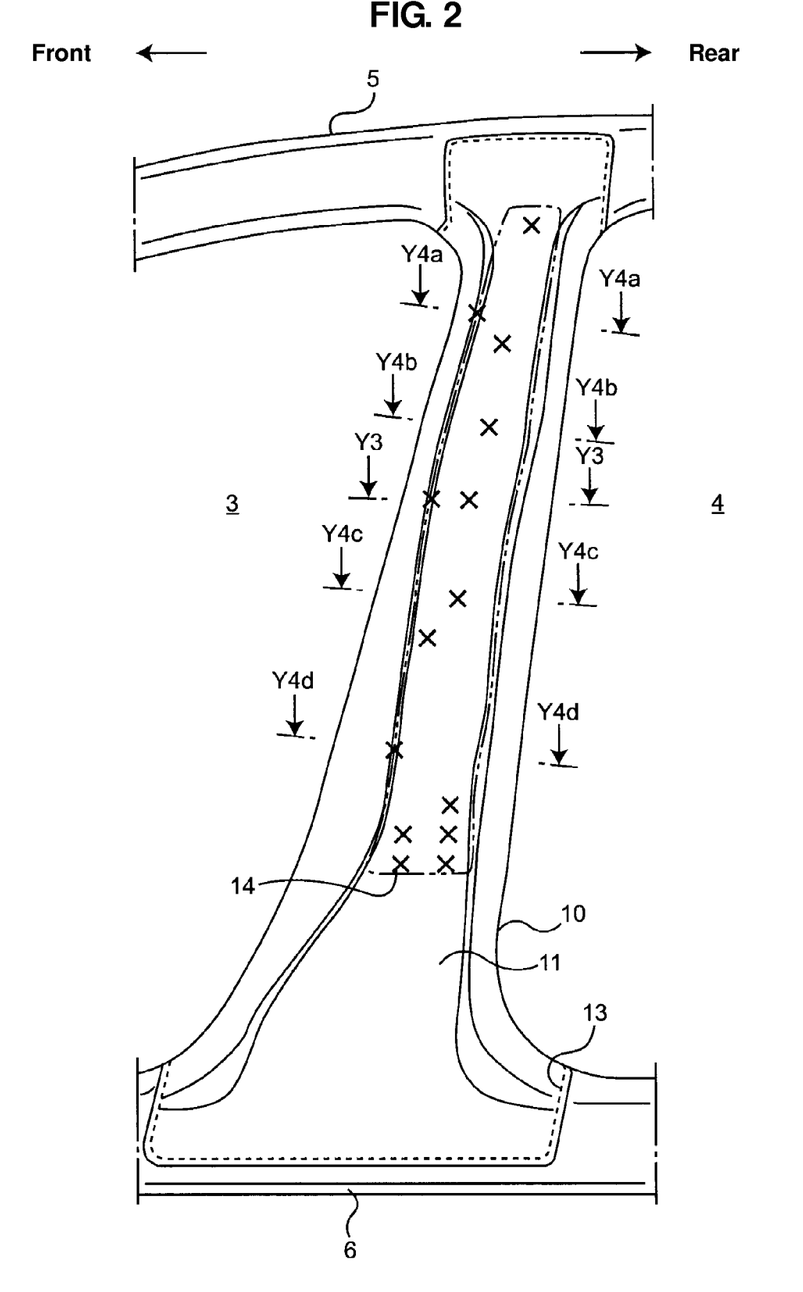
FIG. 2 is an enlarged view of a major part of a center pillar of the vehicle body shown in FIG. 1.
Figure 3:
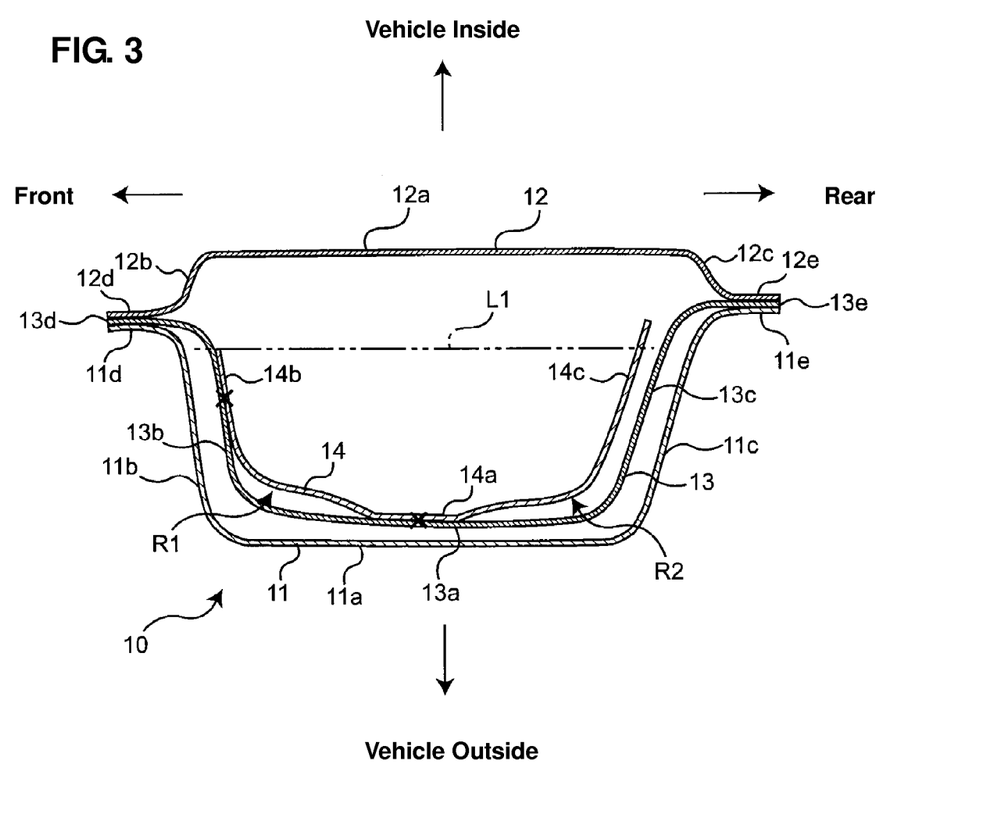
FIG. 3 is a sectional view of the center pillar taken along line Y3-Y3 of FIG. 2.

Hereafter, a preferred embodiment of the present invention will be described referring to the accompanying drawings. FIG. 1 is a side view of a vehicle body to which a vehicle-body side portion structure of a vehicle according to an embodiment of the present invention is applied. FIG. 2 is an enlarged view of a major part of a center pillar of the vehicle body shown in FIG. 1. FIG. 3 is a sectional view of the center pillar taken along line Y3-Y3 of FIG. 2. FIGS. 4A-4D are respective sectional views of the center pillar taken along lines Y4a-Y4a, Y4b-Y4b, Y4c-Y4c, and Y4d-Y4d of FIG. 2.

As shown in FIG. 1, a vehicle body 1, to which a vehicle-body side portion structure of a vehicle according to the embodiment of the present invention is applied, is one of a 4-door type of passenger vehicle. A vehicle-body side portion 2 which forms a side face of the vehicle body 1 comprises a roof rail 5 which extends in a vehicle-body longitudinal direction at a vehicle-body upper portion, a side sill 6 which extends in the vehicle-body longitudinal direction at a vehicle-body lower portion, and a center pillar 10 which extends in a vehicle-body vertical direction at a position between front and rear door openings 3, 4. An upper end of the center pillar 10 is connected to the roof rail 5, and a lower end of the center pillar 10 is connected to the side sill 6.

As shown in FIGS. 2 and 3, the center pillar 10 is formed by an outer panel 11 forming a vehicle-body outside and an inner panel 12 forming a vehicle-body inside so as to have a closed cross section. The outer panel 11 comprises a bottom wall portion 11a which extends in the vehicle-body longitudinal direction, both-side vertical wall portions 11b, 11c which extend inward, in the vehicle-body width direction, from both end portions, in the vehicle-body longitudinal direction, of the bottom wall portion 11a (specifically, a front-side vertical wall portion 11b and a rear-side vertical wall portion 11c), and both-side flange portions 11d, 11e which respectively extend forward and rearward in the vehicle-body longitudinal direction from inward end portions, in the vehicle-body width direction, of the both-side vertical wall portions 11b, 11c (specifically, a front-side flange portion 11d and a rear-side flange portion 11e). Thus, the outer panel 11 has a cross section formed in substantially a hat shape.

The inner panel 12 comprises a bottom wall portion 12a which extends in the vehicle-body longitudinal direction, both-side vertical wall portions 12b, 12c which extend outward, in the vehicle-body width direction, from both end portions, in the vehicle-body longitudinal direction, of the bottom wall portion 12a (specifically, a front-side vertical wall portion 12b and a rear-side vertical wall portion 12c), and both-side flange portions 12d, 12e which respectively extend forward and rearward in the vehicle-body longitudinal direction from outward end portions, in the vehicle-body width direction, of the both-side vertical wall portions 12b, 12c (specifically, a front-side flange portion 12d and a rear-side flange portion 12e). Thus, the inner panel 12 has a cross section formed in substantially a hat shape.

The outer panel 11 and the inner panel 12 are joined to each other at their respective front-side flange portions 11d, 12d and their respective rear-side flange portions 11e, 12e. Thus, the center pillar 10 has a closed cross section.

At the center pillar 10 are also provided a first reinforcement panel 13 and a second reinforcement panel 14 which are arranged between the outer panel 11 and the inner panel 12 to reinforce the center pillar 10. The first reinforcement panel 13 and the second reinforcement panel 14 are respectively shown in a broken line and a two-dotted broken line in FIG. 2. As shown in FIG. 2, the first reinforcement panel 13 and the second reinforcement panel 14 are formed to extend in the vehicle-body vertical direction like the outer panel 11 and the inner panel 12, and a vertical length of the second reinforcement panel 14 is shorter than that of the first reinforcement panel 13.

The first reinforcement panel 13 is arranged substantially along the outer panel 11, and, as shown in FIG. 3, comprises a bottom wall portion 13a which extends in the vehicle-body longitudinal direction, both-side vertical wall portions 13b, 13c which extend inward, in the vehicle-body width direction, from both end portions, in the vehicle-body longitudinal direction, of the bottom wall portion 13a (specifically, a front-side vertical wall portion 13b and a rear-side vertical wall portion 13c), and both-side flange portions 13d, 13e which respectively extend forward and rearward in the vehicle-body longitudinal direction from inward end portions, in the vehicle-body width direction, of the both-side vertical wall portions 13b, 13c (specifically, a front-side flange portion 13d and a rear-side flange portion 13e). Thus, the first reinforcement panel 13 has a cross section formed in substantially a hat shape.

The front-side flange portion 13d and the rear-side flange portion 13e of the first reinforcement panel 13 are respectively arranged between and joined to the respective front-side flange portions 11d, 12d and the respective rear-side flange portions 11e, 12e of the outer panel 11 and the inner panel 12. Thus, the first reinforcement panel 13 is arranged between the outer panel 11 and the inner panel 12.

The second reinforcement panel 14 is arranged substantially along the first reinforcement panel 13, and comprises a bottom wall portion 14a which extends in the vehicle-body longitudinal direction and both-side vertical wall portions 14b, 14c which extend inward, in the vehicle-body width direction, from both end portions, in the vehicle-body longitudinal direction, of the bottom wall portion 14a (specifically, a front-side vertical wall portion 14b and a rear-side vertical wall portion 14c). Thus, the second reinforcement panel 14 has a cross section formed in substantially a U shape.

The second reinforcement panel 14 is, as shown in FIG. 3, arranged inside the first reinforcement panel 13, and the bottom wall portion 14a and the both-side vertical wall portions 14b, 14c of the second reinforcement panel 14 are respectively arranged substantially along the bottom wall portion 13a and the both-side vertical wall portions 13b, 13c of the first reinforcement panel 14.

According to the present embodiment, the second reinforcement panel 14 is joined to the first reinforcement panel 13 only at its bottom wall portion 14a and its one of the vertical wall portions, i.e., the front-side vertical wall portion 14b. That is, the bottom wall portion 14a of the second reinforcement panel 14 is joined to the bottom wall portion 13a of the first reinforcement panel 13, and also the front-side vertical wall portion 14b of the second reinforcement panel 14 is joined to the front-side vertical wall portion 13b of the first reinforcement panel 13.

In FIGS. 2 through 4, joint portions of the first reinforcement panel 13 and the second reinforcement panel 14 which are joined by spot welding are indicated by x marks. In the section shown in FIG. 3, the bottom wall portion 14a and the front-side vertical wall portion 14b of the second reinforcement panel 14 are respectively joined to the bottom wall portion 13a and the front-side vertical wall portion 13b of the first reinforcement panel 13. Herein, as described later on, the second reinforcement panel 14 has substantially-flat joint seat-faces at portions joined to the first reinforcement panel 13.

Meanwhile, the rear-side vertical wall portion 14c of the second reinforcement panel 14 is not joined to the rear-side vertical wall portion 13c of the first reinforcement panel 13, but arranged substantially in parallel to the rear-side vertical wall portion 13c with a specified gap. Thereby, it can be prevented that the rear-side vertical wall portion 14c of the second reinforcement panel 14 interferes with the rear-side vertical wall portion 13c of the first reinforcement panel 13 and thereby noises are generated. Further, even in a case in which the accuracy of dimensions of the both-side vertical wall portions 14b, 14c of the second reinforcement panel 14 is inferior, the above-described effects can be obtained effectively.

The rear-side vertical wall portion 14c of the second reinforcement panel 14, as shown in FIG. 3, extends inward, in the vehicle-body width direction, more than the rear-side vertical wall portion 14b of the second reinforcement panel 14, so that it extends inward beyond a line L1 indicating an inward position of the rear-side vertical wall portion 14b. Thus, comparing to a case in which the rear-side vertical wall portion 14c of the second reinforcement panel 14 extends, in the vehicle-body width direction, to substantially the same position as the front-side vertical wall portion 14b of the second reinforcement panel 14 does, the modulus of section of the center pillar 10 can be increased, thereby increasing the rigidity of the center pillar 10.

In the sections shown in FIGS. 4A through 4D as well, the second reinforcement panel 14 is provided such that the bottom wall portion 14a and the both-side vertical wall portions 14b, 14c are arranged respectively along the bottom wall portion 13a and the both-side vertical wall portions 13b, 13c of the first reinforcement panel 13. Further, in the sections shown in FIGS. 4A through 4D, only the bottom wall portion 14a or the front-side vertical wall portion 14b of the second reinforcement panel 14 are respectively joined to the bottom wall portion 13a or the front-side vertical wall portion 13b of the first reinforcement panel 13.

Figure 4A:
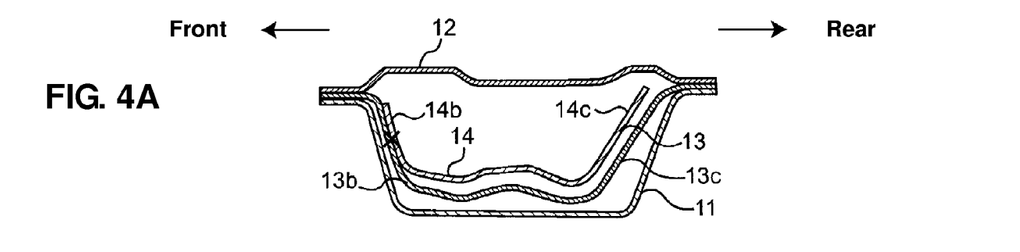
FIGS. 4A-4D are respective sectional views of the center pillar taken along lines Y4a-Y4a, Y4b-Y4b, Y4c-Y4c, and Y4d-Y4d of FIG. 2.
Figure 4B:
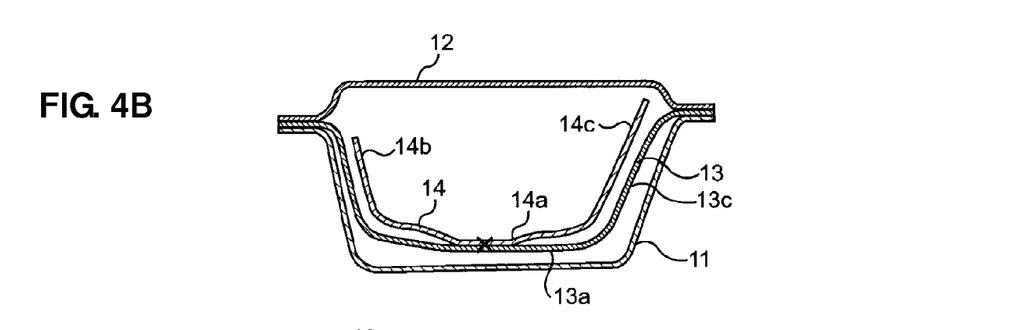
Figure 4C:
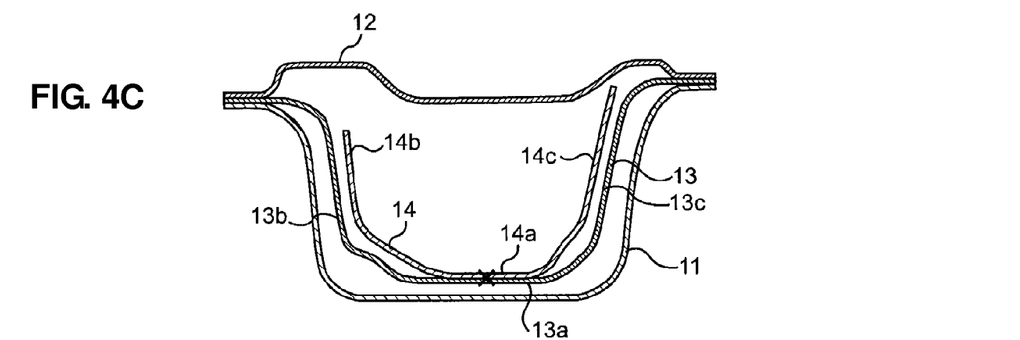
Figure 4D:
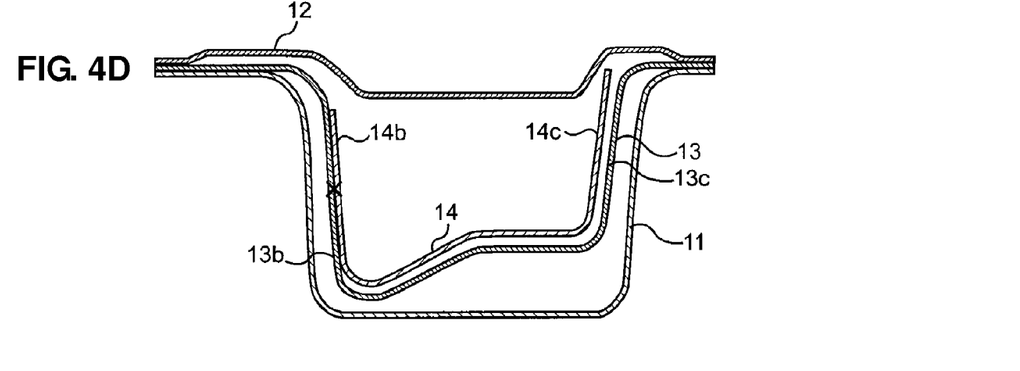

Specifically, in the sections shown in FIGS. 4A and 4D, the front-side vertical wall portion 14b of the second reinforcement panel 14 is joined to the front-side vertical wall portion 13b of the first reinforcement panel 13, and in the sections shown in FIGS. 4B and 4C, the bottom wall portion 14a of the second reinforcement panel 14 is joined to the bottom wall portion 13a of the first reinforcement panel 13.

In the sections shown in FIG. 4A through 4D as well, the rear-side vertical wall portion 14c of the second reinforcement panel 14 is not joined to the rear-side vertical wall portion 13c of the first reinforcement panel 13, but arranged substantially in parallel to the rear-side vertical wall portion 13c with the specified gap, and extends inward, in the vehicle-body width direction, more than the front-side vertical wall portion 14b of the second reinforcement panel 14.

According to the present embodiment, only the bottom wall portion 14a and the front-side vertical wall portion 14b of the second reinforcement panel 14 are respectively joined to the bottom wall portion 13a and the front-side vertical wall portion 13b of the first reinforcement panel 13, and, as shown in FIG. 2, the front-side vertical wall portion 14b of the second reinforcement panel 14 is joined to the front-side vertical wall portion 13b of the first reinforcement panel 13 at three points of an upper position, a central position, and a lower position in the vehicle-body vertical direction of the center pillar 10.

Figure 5:
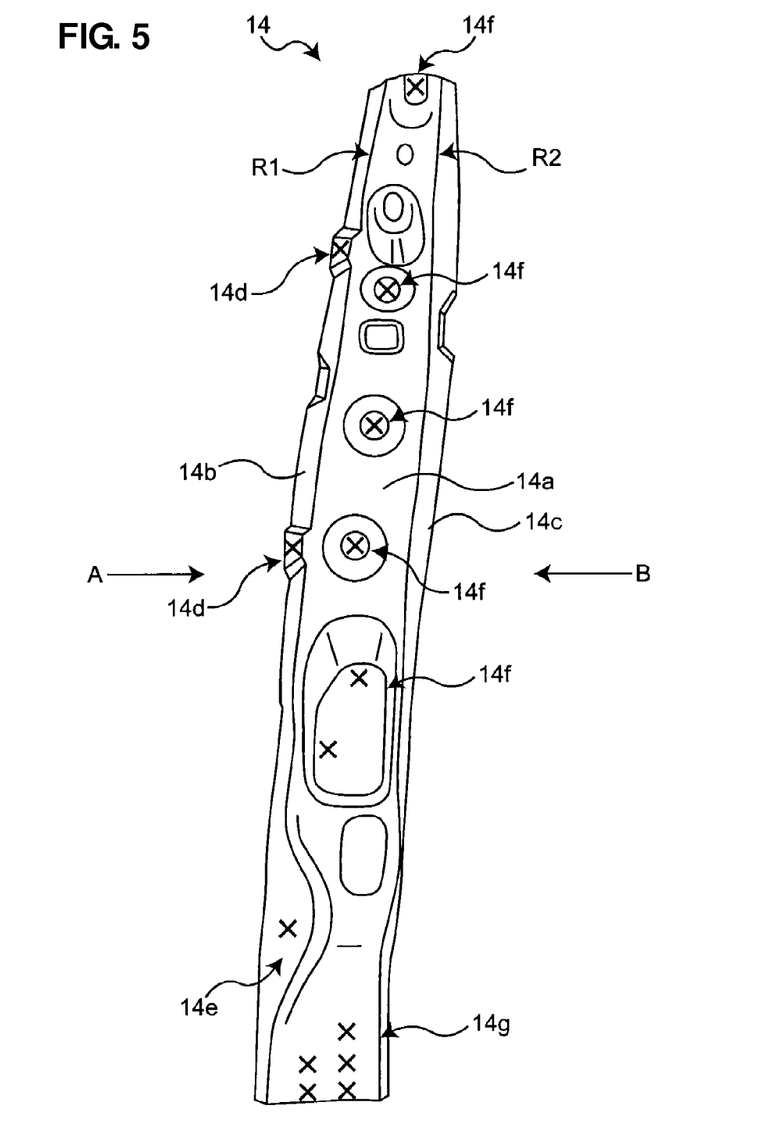
FIG. 5 is an elevational view of a second reinforcement panel arranged inside the center pillar.
Figure 6:
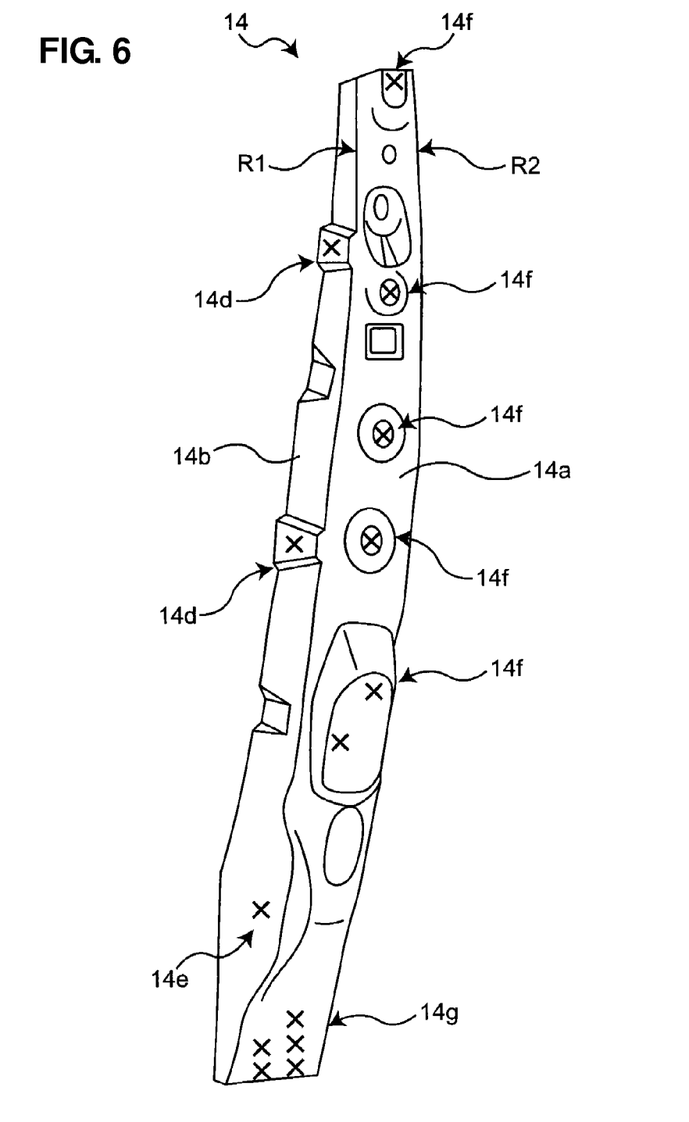
FIG. 6 is a perspective view of the second reinforcement panel shown in FIG. 5, when viewed from an arrow A direction.
Figure 7:
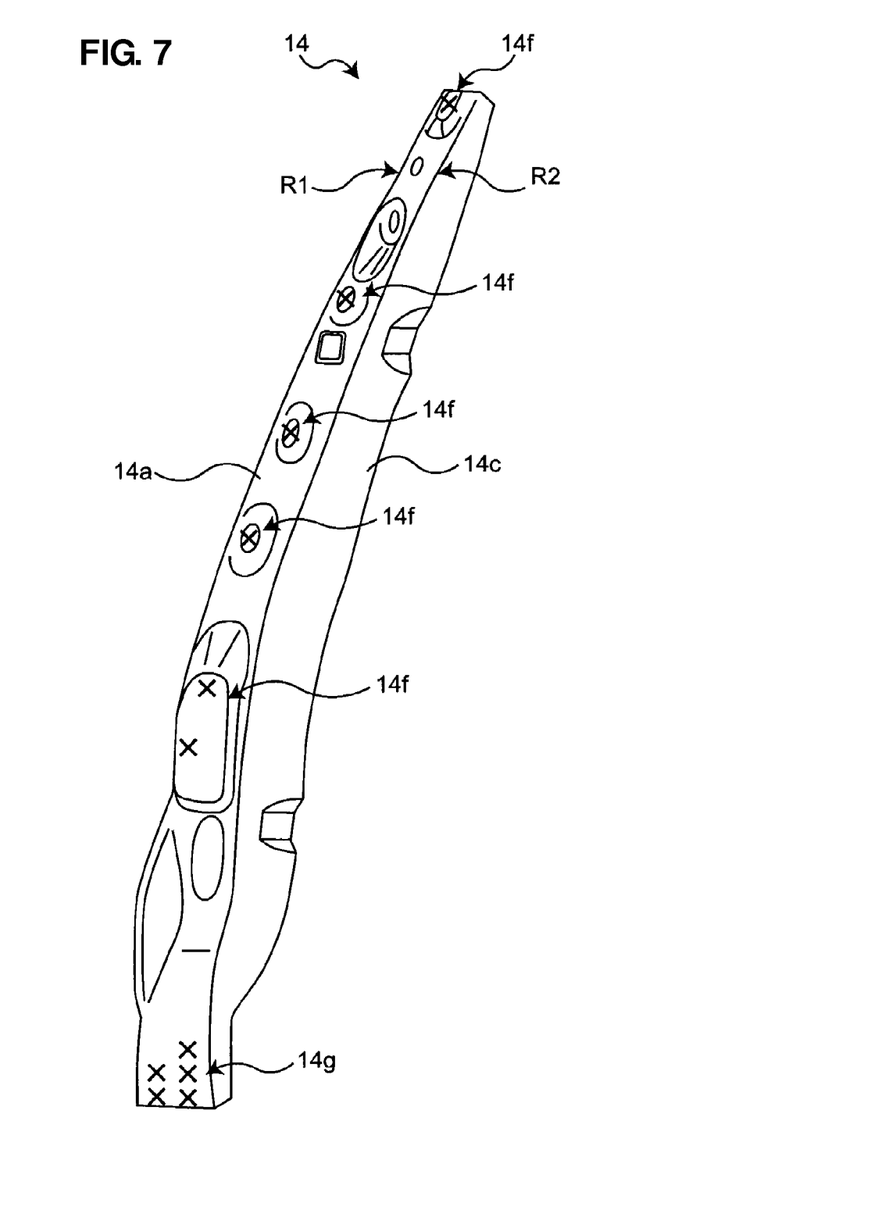
FIG. 7 is a perspective view of the second reinforcement panel shown in FIG. 5, when viewed from an arrow B direction.

Hereafter, the second reinforcement panel 14 will be described referring to FIGS. 5 through 7. FIG. 5 is an elevational view of the second reinforcement panel arranged inside the center pillar, FIG. 6 is a perspective view of the second reinforcement panel shown in FIG. 5, when viewed from an arrow A direction, and FIG. 7 is a perspective view of the second reinforcement panel shown in FIG. 5, when viewed from an arrow B direction. In FIGS. 5 through 7, the spot-welding joint portions of the second reinforcement panel 14 to the first reinforcement panel 13 are indicated by x marks.

The second reinforcement panel 14, as described above, extends in the vehicle-body vertical direction, comprises the bottom wall portion 14a and the both-side vertical wall portions 14b, 14c, and has the cross section formed substantially in the U shape. Further, the second reinforcement panel 14 has, as shown in FIGS. 5 and 6, substantially-flat joint seat-faces 14d, 14e at its upper, central and lower portions joined to the first reinforcement panel 13. These joint seat-faces 14d, 14e of the second reinforcement panel 14 are joined, by spot welding, to the front-side vertical wall portion 13b of the first reinforcement panel 13.

The upper and central joint seat face 14d of the front-side vertical wall portion 14b of the second reinforcement panel 14 are formed to project outward in substantially a trapezoid shape. Thereby, a ridgeline R1 between the bottom wall portion 14a and the front-side vertical wall portion 14b of the second reinforcement panel 14 is uneven, thereby not continuous along the longitudinal direction of the center pillar 10.

Meanwhile, the lower joint seat face 14e of the front-side vertical wall portion 14b of the second reinforcement panel 14 is formed not to project outward, but in substantially a flat shape so that a striker (not illustrated) for engaging a front door (not illustrated) with the vehicle body 1 is attached to this joint seat face 14e.

Further, the second reinforcement panel 14 has, as shown in FIGS. 5 through 7, substantially-flat joint seat-faces 14f, 14g at plural portions of the bottom wall portion 14a which are joined to the first reinforcement panel 13. These joint seat-faces 14f, 14g of the second reinforcement panel 14 are joined, by spot welding, to the bottom wall portion 13a of the first reinforcement panel 13.

The plural joint seat-faces 14f provided at the bottom wall portion 14a of the second reinforcement panel 14 are formed to project outward. The joint seat-face 14g provided at a lower portion of the bottom wall portion 14a of the second reinforcement panel 14 is formed not to project outward, so that the lower portion of the bottom wall portion 14a is formed in substantially a flat shape.

Meanwhile, the rear-side vertical wall portion 14c of the second reinforcement panel 14 is not joined to the rear-side vertical wall portion 13c of the first reinforcement panel 13, and therefore no joint seat-face for joint to the rear-side vertical wall portion 13c is formed. A ridgeline R2 between the bottom wall portion 14a and the rear-side vertical wall portion 14c of the second reinforcement panel 14 is not uneven, thereby continuous along the longitudinal direction of the center pillar 10.

While the second reinforcement panel 14 is joined to the first reinforcement panel 13 only at its bottom wall portion 14a and its front-side vertical wall portion 14b which are respectively joined to the bottom wall portion 13a and the front-side vertical wall portion 13b of the first reinforcement panel 13 in the present embodiment, only the bottom wall portion 14a and the rear-side vertical wall portion 14c may be joined to the bottom wall portion 13a and the rear-side vertical wall portion 13c, respectively. In this case, the front-side vertical wall portion 14b of the second reinforcement panel 14 is arranged substantially in parallel to the front-side vertical wall portion 13b with a specified gap and extends inward, in the vehicle-body width direction, more than the rear-side vertical wall portion 14c of the second reinforcement panel 14, and the ridgeline R1 between the bottom wall portion 14a and the front-side vertical wall portion 14b is formed to be continuous along the longitudinal direction of the center pillar 10.

Herein, in the present embodiment, the outer panel 11, the inter panel 12 of the center pillar 10, the first reinforcement panel 13 and the second reinforcement panel 14 are respectively made of a metal plate, such as a steel plate, which is formed by pressing, preferably made of a high-tension steel plate which is formed by pressing.

As described above, according to the present embodiment, the center pillar 10 includes the first reinforcement panel 13 comprising the bottom wall portion 13a, the both-side vertical wall portions 13b, 13c, and the both-side flange portions 13d, 13e and having the cross section formed in substantially the hat shape, the second reinforcement panel 14 comprising the bottom wall portion 14a and the both-side vertical wall portions 14b, 14c and having the cross section formed in substantially the U shape is arranged inside the first reinforcement panel 13, and the second reinforcement panel 14 is joined to the first reinforcement panel 13 such that only the bottom wall portion 14a and the one of the both-side vertical wall portions 14b are joined to the bottom wall portion 13a and the one of the both-side vertical wall portions 13b, respectively.

Thereby, since the second reinforcement panel 14 is joined to the first reinforcement panel 13 only at its bottom wall portion 14a and its one of the vertical wall portions 14b, comparing to a case in which the second reinforcement panel 14 is joined to the first reinforcement panel 13 at its bottom wall portion 14a and its both of the vertical wall portions 14b, 14c, the gap between respective joint portions of the vertical wall portion 14b of the second reinforcement panel 14 and the vertical wall portion 13b of the first reinforcement panel 13 can be restrained from being improperly changeable, thereby obtaining the stable joint quality at the reinforcement panels 13, 14 of the center pillar 10.

In the case in which the second reinforcement panel 14 is joined to the first reinforcement panel 13 at its bottom wall portion 14a and its both of the vertical wall portions 14b, 14c, since the high accuracy of dimensions is required to the both-side vertical wall portions 14b, 14c of the second reinforcement panel 14, the necessity of modifying or disusing the second reinforcement panel 14 after its press forming may increase in order to ensure the accuracy of dimensions, so that the productivity may deteriorate. However, since the second reinforcement panel 14 is joined to the first reinforcement panel 13 only at its bottom wall portion 14a and its one of the vertical wall portions 14b according to the present embodiment, the stable joint quality can be obtained at the reinforcement panels 13, 14 of the center pillar 10 and also the productivity at the time of vehicle-body manufacturing can be improved. In particular, the above-described effects can be effectively obtained in the case in which the second reinforcement panel 14 is made of the high-tension steel plate, which may cause a large spring back occurring after the press forming.

Further, since the second reinforcement panel 14 is configured such that the ridgeline R2 between the bottom wall portion 14a and the other of the both-side vertical wall portions 14c is continuous along the longitudinal direction of the center pillar 10, comparing to a case in which the second reinforcement panel 14 is configured such that the ridgeline R2 between the bottom wall portion 14a and the other of the both-side vertical wall portions 14c is uneven, thereby not continuous along the longitudinal direction of the center pillar 10, any stress-concentration source or deformation starting-point can be properly restrained from being formed at the time of load inputting, so that the reinforcing effect by the second reinforcement panel 14 can be increased. Even in the case in which the second reinforcement panel 14 is joined to the first reinforcement panel 13 only at the bottom wall portion 14a and the one of the vertical wall portions 14b, the reinforcing effect by the second reinforcement panel 14 can be obtained effectively.

Moreover, since the one of the both-side vertical wall portions 14b of the second reinforcement panel 14 is joined to the one of the both-side vertical wall portions 13b of the first reinforcement panel 13 at three points of the upper position, the central position, and the lower position in the vehicle-body vertical direction of the center pillar 10, the productivity at the time of manufacturing vehicle body can be improved, obtaining the reinforcing effect by the second reinforcement panel 14 effectively.

The present invention should not be limited to the above-described embodiment, and any other modifications or improvements may be applied within the scope of a sprit of the present invention.

What is claimed is:

1. A vehicle-body side portion structure of a vehicle, which includes a center pillar extending in a vehicle-body vertical direction at a position between front and rear door openings formed at a vehicle-body side portion, the center pillar comprising:
   an outer panel forming a vehicle-body outside;
   an inner panel forming a vehicle-body inside;
   a first reinforcement panel provided between the outer panel and the inner panel and comprising a bottom wall portion extending in a vehicle-body longitudinal direction, both-side vertical wall portions extending in a vehicle-body width direction from the bottom wall portion, and both-side flange portions extending in the vehicle-body longitudinal direction from the both-side vertical wall portions, whereby a cross section of the first reinforcement panel is formed in substantially a hat shape; and a second reinforcement panel provided inside the first reinforcement panel and comprising a bottom wall portion extending in the vehicle-body longitudinal direction and both-side vertical wall portions extending in the vehicle-body width direction from the bottom wall portion, whereby a cross section of the second reinforcement panel is formed in substantially a U shape, wherein said second reinforcement panel is provided inside the first reinforcement panel such that the bottom wall portion and the both-side vertical wall portions of the second reinforcement panel substantially match the bottom wall portion and the both-side vertical wall portions of the first reinforcement panel, respectively, and said second reinforcement panel is joined to the first reinforcement panel such that the bottom wall portion of the second reinforcement panel is joined to the bottom wall portion of the first reinforcement panel and one of the both-side vertical wall portions of the second reinforcement panel is joined to one of the both-side vertical wall portions of the first reinforcement panel which matches said one of the both-side vertical wall portions of the second reinforcement panel, without joining the other of the both-side vertical wall portions of the second reinforcement panel to the other of the both-side vertical wall portions of the first reinforcement panel which matches the other of the both-side vertical wall portions of the second reinforcement panel.

2. The vehicle-body side portion structure of a vehicle of claim 1, wherein said second reinforcement panel is configured such that a ridgeline between the bottom wall portion thereof and the other of the both-side vertical wall portions thereof is continuous along a longitudinal direction of said center pillar.

3. The vehicle-body side portion structure of a vehicle of claim 2, wherein said second reinforcement panel is arranged such that the bottom wall portion thereof is positioned on an outward side, in the vehicle-body width direction, relative to the both-side vertical wall portions thereof, and said other of the both-side vertical wall portions of the second reinforcement panel extends inward, in the vehicle-body width direction, more than said one of the both-side vertical wall portions of the second reinforcement panel.

4. The vehicle-body side portion structure of a vehicle of claim 3, wherein said other of the both-side vertical wall portions of the second reinforcement panel is arranged substantially in parallel to the other of the both-side vertical wall portions of said first reinforcement panel with a specified gap therebetween.

5. The vehicle-body side portion structure of a vehicle of claim 4, wherein said one of the both-side vertical wall portions of the second reinforcement panel is joined to said one of the both-side vertical wall portions of the first reinforcement panel at three points of an upper position, a central position, and a lower position in the vehicle-body vertical direction of the center pillar.

6. The vehicle-body side portion structure of a vehicle of claim 2, wherein said other of the both-side vertical wall portions of the second reinforcement panel is arranged substantially in parallel to the other of the both-side vertical wall portions of said first reinforcement panel with a specified gap therebetween.

7. The vehicle-body side portion structure of a vehicle of claim 1, wherein said second reinforcement panel is arranged such that the bottom wall portion thereof is positioned on an outward side, in the vehicle-body width direction, relative to the both-side vertical wall portions thereof, and said other of the both-side vertical wall portions of the second reinforcement panel extends inward, in the vehicle-body width direction, more than said one of the both-side vertical wall portions of the second reinforcement panel.

8. The vehicle-body side portion structure of a vehicle of claim 7, wherein said other of the both-side vertical wall portions of the second reinforcement panel is arranged substantially in parallel to the other of the both-side vertical wall portions of said first reinforcement panel with a specified gap therebetween.

9. The vehicle-body side portion structure of a vehicle of claim 1, wherein said other of the both-side vertical wall portions of the second reinforcement panel is arranged substantially in parallel to the other of the both-side vertical wall portions of said first reinforcement panel with a specified gap therebetween.

10. The vehicle-body side portion structure of a vehicle of claim 1, wherein said one of the both-side vertical wall portions of the second reinforcement panel is joined to said one of the both-side vertical wall portions of the first reinforcement panel at three points of an upper position, a central position, and a lower position in the vehicle-body vertical direction of the center pillar.

* * * * *